Figure 2:
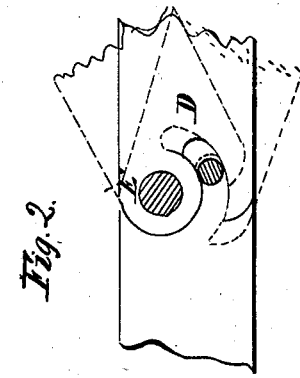
Figure 1:
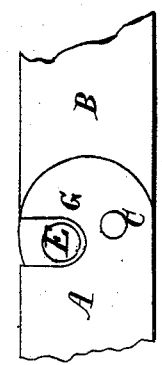
Figure 3:
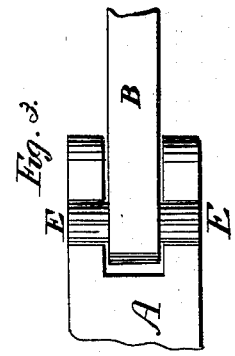

J. F. REINER.
Thill Coupling.

No. 77,915.  
Patented May 12, 1868.

Witnesses.  
J. C. Smith  
A. S. Kaufman

Inventor.  
John F. Reiner  
Chipman Hosmer & Co  
Attys

United States Patent Office.

JOHN F. REINER, OF COLUMBUS CITY, IOWA.

Letters Patent No. 77,915, dated May 12, 1868.

IMPROVEMENT IN JOINTS FOR SHACKLES.

*The Schedule referred to in these Letters Patent and making part of the same.*

TO WHOM IT MAY CONCERN:

Be it known that I, JOHN F. REINER, of Columbus City, in the county of Louisa, and State of Iowa, have invented a new and improved Joint or Shackle; and I do hereby declare that the following is a full, clear, and exact description of the construction and operation of the same, reference being had to the annexed drawings, making a part of this specification, and to the letters and figures of reference marked thereon.

The nature of my invention consists in so shaping the ends of two pieces of wood or iron that they shall form a strong, firm joint, adjustable at any desired angle, and which at the same time may be easily disconnected at the will of the operator.

The letter A of the drawings represents a piece of wood or iron, mortised to receive the end of the piece B. Letter C is a bolt, running through the piece A, of suitable size to receive the clutch D on piece B. Letter E is a bolt, passing through the piece B, and fitted to rest and work in the hollows G on piece A.

It will readily be perceived that the devices above mentioned enable me to place the ends of the two pieces together in such manner that the clutch D shall grasp the bolt C, while the bolt E is held securely in the hollows G, thereby forming an adjustable joint without the use of nuts or keys.

I am aware that similar devices have been used in certain mechanical operations, but it will be found upon examination that nothing has ever before been invented which combines all the practical advantages and mechanical functions herein shown. All other devices of a similar character are constructed in such form that the separation of the two parts becomes inevitable when the parts are placed on a certain angle. My device, on the contrary, is so arranged that the separation of the parts takes place at the will of the operator only.

In buildings, where it may be desirable to remove the braces, rafters, and the like, my device can be advantageously used by making the joints or connections between such rafters and braces with each other and with the framework, after the plan herein shown and described.

My device is also useful in attaching tongues and shafts to carriages, where speedy detachment is so often desirable.

What I claim as my invention, and desire to secure by Letters Patent, is—

A joint or shackle, having parts A and B, bolts C and E, clutch D, and hollows G, constructed, combined, and arranged substantially as specified.

JOHN F. REINER.

Witnesses:
JAMES GOBLE,
H. L. DENHAM.